Feb. 13, 1945.　　　M. K. MACAFEE　　　2,369,587
ADJUSTABLE BLADE REAMER
Filed Aug. 22, 1944
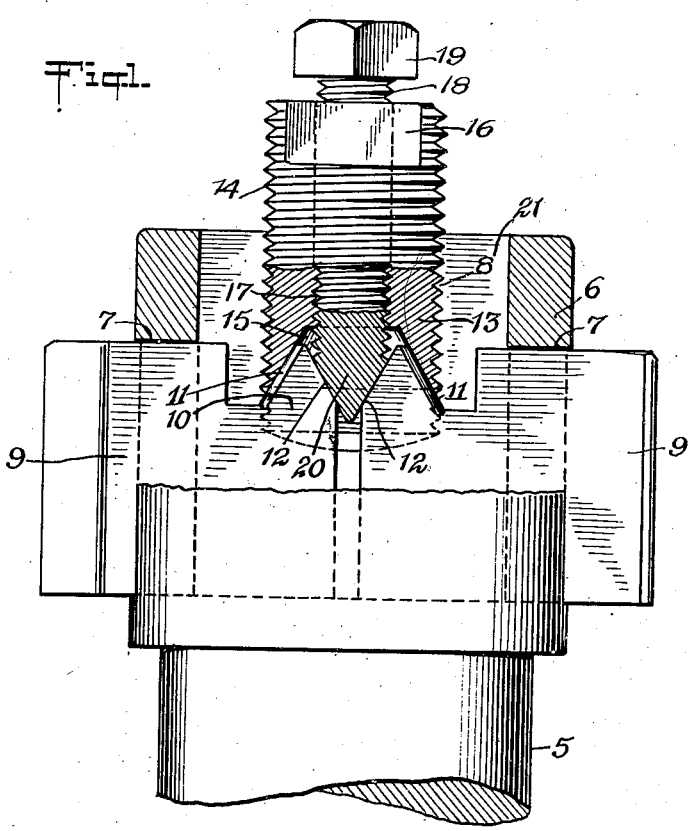
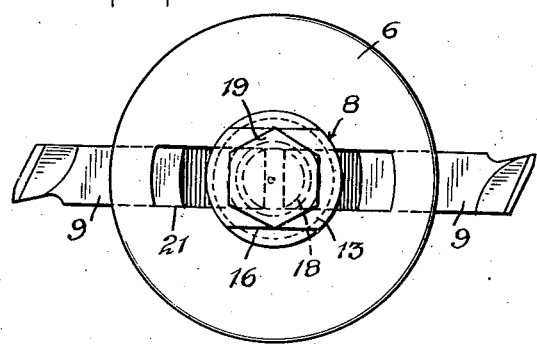
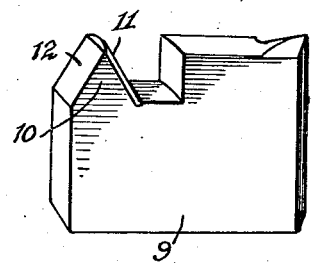
WITNESSES
INVENTOR.
Millard K. Macafee
BY
ATTORNEYS Patented Feb. 13, 1945

2,369,587

UNITED STATES PATENT OFFICE 2,369,587

ADJUSTABLE BLADE REAMER

Millard K. Macafee, Brooklyn, N. Y.

Application August 22, 1944, Serial No. 550,525

7 Claims. (Cl. 77—75)

This invention relates to cutting tools, and has particular reference to certain improvements in an adjustable blade reamer.

The invention primarily comprehends in a reamer which includes a shank and blades mounted for radial inward and outward movement, an improved means for effecting radial adjustments of the blades, which means serves to rigidly lock the same in adjusted position and which means further insures a proper centering of the blades with respect to the shank, in order that the tool will cut accurately any diameter within certain limits.

The invention further contemplates an improved means for effecting the radial adjustments of reamer blades in which the manipulating portions of the adjusting elements are disposed in close proximity and at one extremity of the shank.

Other objects reside in the simplicity of construction of the reamer and its blade adjusting means, the economy with which it may be produced and the general efficiency derived therefrom.

With the above recited and other objects in view, reference is had to the following description and accompanying drawing, in which there is exhibited one example or embodiment of the invention, while the claims define the actual scope of the same.

In the drawing—

Fig. 1 is an enlarged fragmentary side view of the reamer with parts broken away and shown in section to disclose the underlying structure.

Fig. 2 is an end view of the reamer on a reduced scale.

Fig. 3 is a perspective view of one of the reamer blades removed from the shank.

Referring to the drawing by characters of reference, 5 designates a shank having a head 6 formed with radial slots 7 diametrically opposite each other. From its outer free end the head is provided with a concentric internally threaded axial bore 8 which communicates with the slots 7. Reamer blades 9 of a suitable size and configuration are provided to snugly fit within the slots 7 and are provided at their inner ends with axially projecting substantially V-shaped lugs or projections 10, each presenting an outer rounded or convex surface 11 and a flat inner surface 12. While two blades are shown in the present instance, it is to be understood more than two blades may be provided. An adjuster 13 having external threads 14 is threadedly engaged in the bore 8 and said adjuster is provided in its inner end with a frusto-conical recess 15. The adjuster is provided with a multi-faced end 16 for the purpose of receiving an adjusting wrench. The adjuster is provided with a coaxial internally threaded bore 17 extending completely therethrough for receiving the locking screw 18 having a multi-faced outer extremity 19 for the reception of a wrench. The screw 18 is provided with a conical inner end 20 which serves as a cam.

In use and operation, turning movement of the adjuster in one direction to move the same axially inward effects the simultaneous radial inward movement of the blades 9 by virtue of the camming engagement of the frusto-conical periphery of the recess 15 with the outer converging faces 11 of the lugs 10. Conversely, turning movement of the screw 18 in a direction to cause axial inward movement of said screw effects the simultaneous radial outward movement of the blades 9 due to the camming action set up by the conical end 20 with the inner converging faces 12 of the lugs 10. It is, of course, obvious that to radially adjust the blades outwardly with the parts in the position illustrated in Fig. 1, it is first necessary to turn the adjuster in a direction to cause the same to move axially outward. After the proper outward adjustment has been made through the medium of the adjuster 13, the screw 18 will be screwed inwardly so that the end 20 will cooperate with the surface of the recess 15, to bind and lock the blades in their adjusted positions. When the blades are to be adjusted inwardly, the screw 18 is initially turned in a direction to move the same axially outward, after which the adjuster 13 is turned in a direction to move the same axially inward. If desired, the head 6 may be provided with grooves 21 extending radially from the bore 8 to facilitate the assembly of the reamer when new blades or substitute blades are being associated with the head. These grooves render the blade lugs 10 visible through the end of the head. By rounding or forming the outer faces 11 convex, friction due to the camming engagement of the inner periphery of the frusto-conical recess is reduced to a minimum. The inner flat faces 12, however, bear against the rounded periphery of the conical end 20.

I claim:

1. An adjustable reamer including a head having a coaxial bore and radial blade holding slots communicating with said bore, blades occupying said slots respectively, said blades having projections, an adjuster operable in said bore having a conical surface which acts on said projections to adjust said blades radially inward simultaneously, and an element which acts on said projections to adjust said blades radially outward simultaneously, and said element coacting with said adjuster and the projections to lock said blades in the adjusted position.

2. An adjustable reamer according to claim 1, wherein said bore is screw threaded, and said adjuster consists of a screw whose inner end embodies said conical surface.

3. An adjustable reamer according to claim 1, wherein said projections are similarly cut complemental to said conical surface.

4. An adjustable reamer according to claim 1, wherein said bore is screw threaded, said adjuster consists of a screw whose inner end embodies the conical surface, and said projections are similarly cut complemental to said conical surface.

5. An adjustable reamer according to claim 1, wherein said element consists of a set screw carried by the adjuster coaxially thereof, the set screw having a conical surface which acts on said projections.

6. An adjustable reamer including a head having a threaded coaxial bore and radial blade holding slots communicating with said bore, material removing blades occupying said slots respectively, said blades having V shape projections, an adjusting screw operable in said bore and having a cavity providing a conical surface in the inner end thereof engaged with said projections for radially adjusting said blades equally and simultaneously, and a pointed set screw operable in a tapped longitudinal bore in said adjusting screw engageable with said projections to cooperate with said adjusting screw for locking the blades in the adjusted position.

7. An adjustable blade reamer including a shank having radial slots and a threaded concentric axial bore communicating with said slots, a plurality of blades mounted in said slots for radial inward and outward movement, axially projecting V shaped lugs on said blades presenting inner and outer converging beveled faces, a threaded adjuster in said bore having a frusto-conical recess at its inner end coacting with the outer faces of the lugs upon inward axial movement of the adjuster to effect simultaneous radial inward movement of the blades and a locking screw threaded axially and concentrically into said adjuster having a conical inner end coacting with the inner faces of the blade lugs to effect simultaneous radial outward movement of said blades, the said adjuster and screw combining to secure the blades in their adjusted positions and the said outer faces of the lugs being transversely rounded to reduce friction.

MILLARD K. MACAFEE.